(12) United States Patent
Nam (10) Patent No.: US 8,131,106 B2
(45) Date of Patent: Mar. 6, 2012

(54) BLOCKING EFFECT REMOVAL SYSTEM AND METHOD

(75) Inventor: Gun Woo Nam, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1033 days.

(21) Appl. No.: 12/013,671

(22) Filed: Jan. 14, 2008

(65) Prior Publication Data

US 2009/0060376 A1  Mar. 5, 2009

(30) Foreign Application Priority Data

Aug. 30, 2007  (KR) .................. 10-2007-0087681

(51) Int. Cl.
*G06K 9/40* (2006.01)

(52) U.S. Cl. ........ 382/268; 382/274; 382/275; 382/282; 358/3.26; 358/3.27; 358/463

(58) Field of Classification Search .................. 382/260, 382/268, 274, 275, 282; 358/3.26, 3.27, 358/463
See application file for complete search history.

(56) References Cited

U.S. PATENT DOCUMENTS

| 5,818,977 | A  | * | 10/1998 | Tansley ..................... 382/294 |
| 5,828,793 | A  | * | 10/1998 | Mann ........................ 382/284 |
| 6,219,097 | B1 | * | 4/2001  | Kamishima et al. ......... 348/297 |
| 6,486,915 | B2 | * | 11/2002 | Bell et al. .................... 348/362 |
| 6,614,923 | B1 | * | 9/2003  | Shishido et al. ............ 382/149 |
| 6,763,129 | B1 | * | 7/2004  | Honda et al. ................ 382/132 |
| 6,937,761 | B2 | * | 8/2005  | Thomas et al. .............. 382/173 |
| 6,950,562 | B2 | * | 9/2005  | Rouvellou .................. 382/264 |

\* cited by examiner

*Primary Examiner* — Yosef Kassa (74) *Attorney, Agent, or Firm* — Staas & Halsey LLP (57) ABSTRACT

A blocking effect removal system and method is provided. A blocking effect removal system, including: a pixel segment extraction unit to extract a pixel segment which satisfies a homogeneity with respect to each pixel group adjacent to a block boundary of an image; a filtering mode determination unit to determine a filtering mode corresponding to a filtering direction by considering a size of the extracted pixel segment; a direction vector determination unit to determine a direction vector which is applied to pixels adjacent to the block boundary considering the filtering mode; and a pixel segment filtering unit to filter an entire area of the pixel segment, adjacent to the block boundary, according to the filtering direction.

23 Claims, 8 Drawing Sheets

BLOCKING EFFECT REMOVAL SYSTEM AND METHOD

CROSS-REFERENCE TO RELATED APPLICATION

This application claims the benefit of Korean Patent Application No. 2007-87681, filed in the Korean Intellectual Property Office on Aug. 30, 2007, the disclosure of which is incorporated herein by reference.

BACKGROUND OF THE INVENTION

1. Field of the Invention

Aspects of the present invention relate to a blocking effect removal system and method, and more particularly, to a blocking effect removal system and method which extracts a homogeneous pixel segment, filters the extracted pixel segment according to a direction vector, and thereby can remove a blocking effect.

2. Description of the Related Art

Encoding of image data is critical to transmit an image or to store in a storage medium via a network having a fixed bandwidth. Much research has been conducted to efficiently transmit and store an image. A transform-based encoding method is most widely used, and more particularly, a discrete cosine transform (DCT) technology is widely used.

Codecs based on a local DCT such as Moving Picture Experts Group (MPEG), joint photographic experts group (JPEG), and H.264, use a local correlation of image. That is, such codecs divide an image into a plurality of blocks including N*N pixels, and individually apply a DCT for each block. In this instance, since a DCT is applied for each block, a connection among adjacent blocks is disconnected, and a discontinued frequency is shown on a block boundary.

Then, when an image is processed by a DCT-based codec, it can be visually evident that an image is divided into blocks by boundaries. The boundaries are referred to as a blocking artifact, and a blocking effect indicates an effect in which a blocking artifact occurs.

MPEG2 is a standard of digital broadcasting, and mobile devices such as DMB use a block DCT-based codec such as H.264 as a standard of moving picture. Accordingly, a deblocking technology is needed to be developed.

A blocking effect can be solved by using a filter such as a low pass filter (LPF) and applying a smoothing to a block boundary. However, it is needed that a high-frequency element such as an edge, included in an original image, is not corrupted when the smoothing is applied to a block boundary.

In a conventional art, a method of controlling a filtering strength for each block exists. In the method, adjacent blocks based on a block boundary are divided into a smooth pair and a detailed pair. Also, a method of controlling a filtering strength for each pixel exists. In the method, an edge map of an image is made for each pixel. In a filtering method, a method in which an overlapped DCT is performed and a high frequency due to blocking is selectively removed, has been used.

However, it is disadvantageous that above-described methods in a conventional art are unsuitable for a low complexity method easily applicable to a mobile terminal. Particularly, in a mobile broadcasting such as DMB, an image is compressed depending on a relative bit rate due to a limit of transmission line, and thus a blocking artifact is easily generated.

Thus, a method which is applicable to a variety of apparatuses and minimizes complexity of operations and a memory use is needed.

SUMMARY OF THE INVENTION

Aspects of the present invention provide a blocking effect removal system and method which filters a homogeneous pixel segment based on a block boundary and removes a blocking effect.

Aspects of the present invention also provide a blocking effect removal system and method which filters within a homogeneous pixel segment, and prevents undesirable corruption of an edge area.

Aspects of the present invention also provide a blocking effect removal system and method which filters within a pixel segment in a same direction based on a block boundary, and can obtain a restoration image with fewer artifacts.

Aspects of the present invention also provide a blocking effect removal system and method changes a filtering mode depending on a length of a pixel segment, and directionally filters based on a block boundary in order to decrease an additional smoothing.

According to an aspect of the present invention, there is provided a blocking effect removal system, including: a pixel segment extraction unit to extract a pixel segment which satisfies a homogeneity with respect to each pixel group adjacent to a block boundary of an image; a filtering mode determination unit to determine a filtering mode corresponding to a filtering direction by considering a size of the extracted pixel segment; a direction vector determination unit to determine a direction vector which is applied to pixels adjacent to the block boundary considering the filtering mode; and a pixel segment filtering unit to filter an entire area of the pixel segment, adjacent to the block boundary, according to the filtering direction.

The pixel segment extraction unit includes: a pixel group interpolation unit to interpolate between a starting pixel and an end pixel using a pixel value of the starting pixel and a pixel value of the end pixel of the pixel group; a homogeneity determination unit to compare a pixel value before the interpolation and a pixel value after the interpolation for each pixel location of the pixel group and determine a homogeneity of the pixel group; and a pixel group division unit to divide the pixel group based on the homogeneity and select a block boundary portion from the divided portions.

According to an aspect of the present invention, there is provided a blocking effect removal method, including: extracting a pixel segment which satisfies a homogeneity with respect to each pixel group adjacent to a block boundary of an image; determining a filtering mode corresponding to a filtering direction by considering a size of the extracted pixel segment; determining a direction vector which is applied to pixels adjacent to the block boundary by considering the filtering mode; and filtering an entire area of the pixel segment, adjacent to the block boundary, according to the filtering direction.

The determining of the direction vector determines a direction having a minimum pixel value difference as the direction vector, the minimum pixel value difference being obtained by using a pixel value difference among pixels in directions which are vertical, horizontal, and diagonal to a particular pixel of the pixel group.

The filtering of the entire area of the pixel segment filters an area of the pixel segment by applying the same filtering direction with respect to the pixels adjacent to the block boundary.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Figure 1:
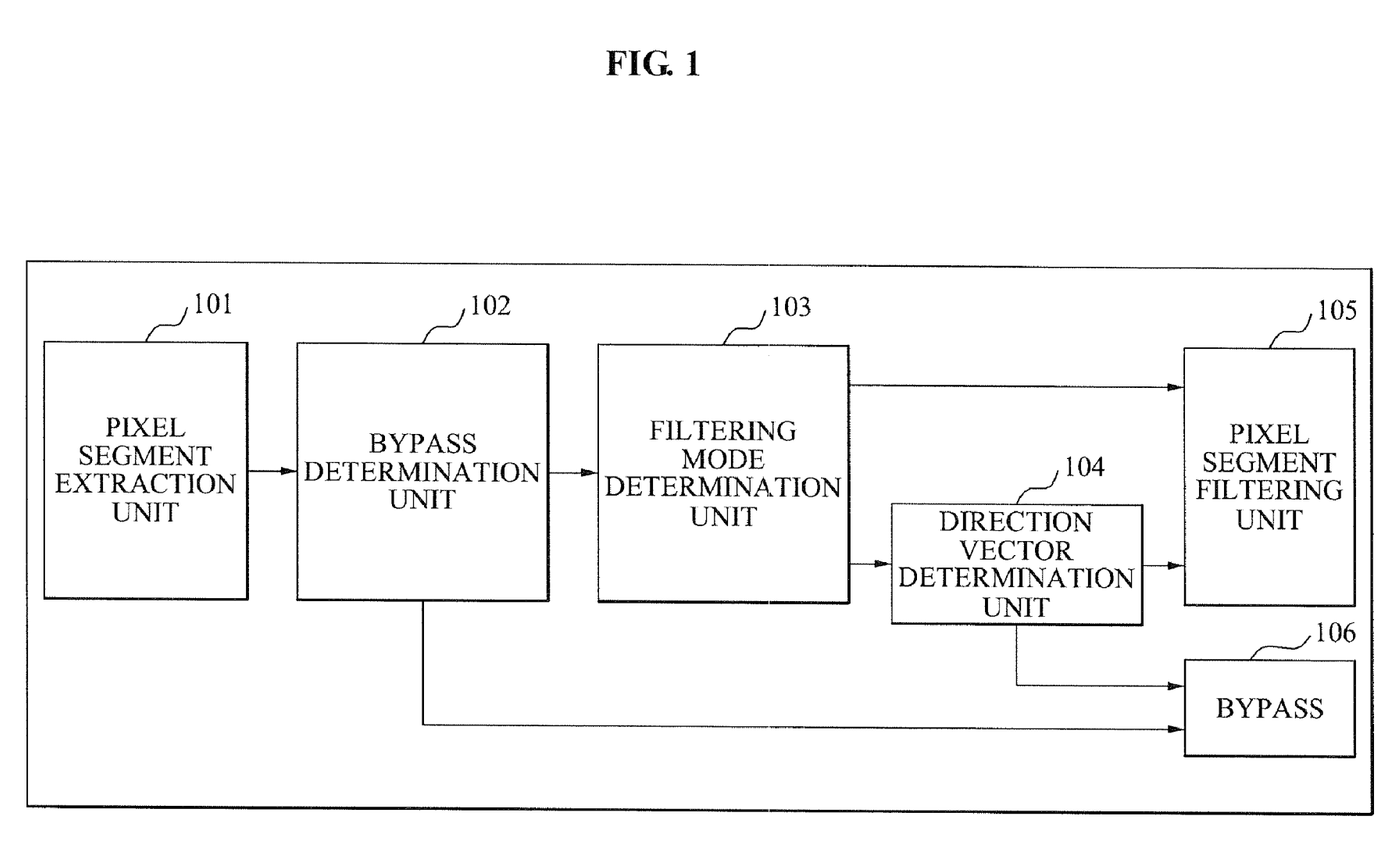
FIG. 1 illustrates a blocking effect removal system according to an embodiment of the present invention.

FIG. 1 illustrates a blocking effect removal system according to an embodiment of the present invention.

Referring to FIG. 1, the blocking effect removal system includes a pixel segment extraction unit 101, a bypass determination unit 102, a filtering mode determination unit 103, a direction vector determination unit 104, and a pixel segment filtering unit 105.

The pixel segment extraction unit 101 can extract a pixel segment which satisfies a homogeneity with respect to each pixel group adjacent to a block boundary of an image. For example, the pixel segment extraction unit 101 can repeatedly divide the pixel groups until the homogeneity satisfies a predetermined standard of homogeneity with respect to each of the pixel groups adjacent to the block boundary of the image. The pixel group is divided, the pixel segment extraction unit 101 can select a block boundary portion from the divided portions.

Specifically, the pixel segment extraction unit 101 can divide a pixel group depending on whether the homogeneity satisfies a predetermined homogeneity with respect to each of the pixel groups. Also, the divided pixel groups can be divided again depending on whether the homogeneity satisfies the predetermined homogeneity. That is, the pixel segment extraction unit 101 can extract the pixel segment which satisfies the predetermined homogeneity from the pixel groups by repeatedly dividing according to the homogeneity.

As another example, the pixel segment extraction unit 101 can sequentially extract the pixel segment. First, the pixel group can be divided into segment unit which can be divided. Also, the pixel segment extraction unit 101 can determine a homogeneity with respect to an entire pixel group divided into segment unit. A pixel group, having largest size among pixel groups showing the homogeneity which satisfies the predetermined standard, can be extracted as the pixel segment.

For example, each of the pixel groups is a single line of pixels adjacent to both sides based on the block boundary of the image. That is, each of the pixel groups indicates the single line of pixels facing each other based on the block boundary of the image.

Here, although each of the pixel groups is the single line of pixels, the present invention is not limited to the described exemplary embodiment. Accordingly, each of the pixel groups can be at least two lines of pixels. However, each of the pixel groups is set to be the single line of pixels in the present specification.

For example, the pixel segment extraction unit 101 interpolates between a starting pixel and an end pixel using a pixel value of the starting pixel and a pixel value of the end pixel of the pixel group. Also, the pixel segment extraction unit 101 compares a pixel value before the interpolation and a pixel value after the interpolation for each pixel location of the pixel group and determines a homogeneity of the pixel group. Also, the pixel segment extraction unit 101 divides the pixel group based on the homogeneity and selects a block boundary portion from the divided portions. The pixel segment extraction unit 101 will be described in greater detail with reference to FIG. 2.

The bypass determination unit 102 can determine whether to bypass the pixel segment using a pixel value difference of pixels adjacent to both sides of the block boundary in the pixel segment. For example, the bypass determination unit 102 can transmit the pixel segment to the filtering mode determination unit 103, when the pixel value difference of pixels adjacent to both sides of the block boundary is less than a predetermined threshold. Conversely, when the pixel value difference of pixels adjacent to both sides of the block boundary is greater than the predetermined threshold, the bypass determination unit 102 can transmit the pixel segment to a bypass 106 to perform a bypass.

The filtering mode determination unit 103 can determine a filtering mode corresponding to a filtering direction by considering a size of the extracted pixel segment. The filtering mode determination unit 103 can determine any one of a first filtering mode and a second filtering mode. The first filtering mode filters in a direction vertical to the block boundary using the size of the pixel segment, and the second filtering mode filters according to the direction vector.

For example, when the size of the pixel segment is greater than the predetermined threshold, the filtering mode determination unit 103 can determine the pixel segment as a smooth direct current (DC) area, and thereby can determine the filtering mode as the first filtering mode which filters in the direction vertical to the block boundary.

When the pixel segment is determined as a DC area, the pixel segment can be recognized as a most sensitive block in human eyes. Accordingly, when the filtering mode is determined to be the first filtering mode, the block boundary can be strongly filtered in the direction vertical to the block boundary.

Also, when the size of the pixel segment is less than the predetermined threshold, the filtering mode determination unit 103 can determine the pixel segment as a complex DC area, and thereby can determine the filtering mode as the second filtering mode which filters according to the direction vector. The filtering mode determination unit 103 can transfer the pixel segment to the direction vector determination unit 104.

When the pixel segment is determined as the complex area, it is understood that an edge area of the image is included in a corresponding pixel segment. In this case, when filtered in the direction vertical to the block boundary, the edge area can be corrupted. Accordingly, when it is determined that the pixel segment includes the edge area, the filtering mode determination unit 103 can determine the filtering mode as the second filtering mode which filters according to the direction vector.

When the second filtering mode is determined by the filtering mode determination unit 103, the direction vector determination unit 104 can determine the direction vector which is applied to the pixels adjacent to the block boundary considering the filtering mode.

The direction vector determination unit 104 determines the direction vector which is applied to the pixels adjacent to the block boundary using pixel values of the pixel group, an upper pixel group adjacent to the pixel group, and a lower pixel group adjacent to the pixel group. The direction vector determination unit 104 can determine the direction vector using the pixel group, not the pixel segment.

Also, the direction vector determination unit 104 can determine a direction having a minimum pixel value difference as the direction vector. The minimum pixel value difference is obtained by using a pixel value difference among pixels in directions which are vertical, horizontal, and diagonal to a particular pixel of the pixel group.

When the direction vector is determined as the direction horizontal to the block boundary, an effect which smoothly filters the block boundary by applying a low pass filter (LPF) is insignificant. Accordingly, when the direction vector is determined as the direction horizontal to the block boundary, the pixel segment can be bypassed 106 without filtering.

Here, a particular pixel can be a pixel most adjacent to the block boundary from among the pixels adjacent to the block boundary. That is, the particular pixel can indicate a second pixel from the block boundary. The direction vector determination unit 104 is described in greater detail with reference to FIG. 6.

The pixel segment filtering unit 105 can filter an entire area of the pixel segment based on the block boundary according to the filtering direction. That is, when the first filtering mode is determined by the filtering mode determination unit 103, the pixel segment filtering unit 105 can filter the entire area of the pixel segment in the direction vertical to the block boundary.

Also, when the second filtering mode is determined by the filtering mode determination unit 103, the pixel segment filtering unit 105 can filter the entire area of the pixel segment according to the direction vector.

The pixel segment filtering unit 105 can filter an area of the pixel segment by applying the same filtering direction with respect to the pixels adjacent to the block boundary. That is, an image with less jagged edges can be restored by filtering in the same filtering direction based on the block boundary. Also, the pixel segment filtering unit 105 can prevent the edge area of the image from being corrupted by filtering only within the extracted pixel segment.

Figure 2:
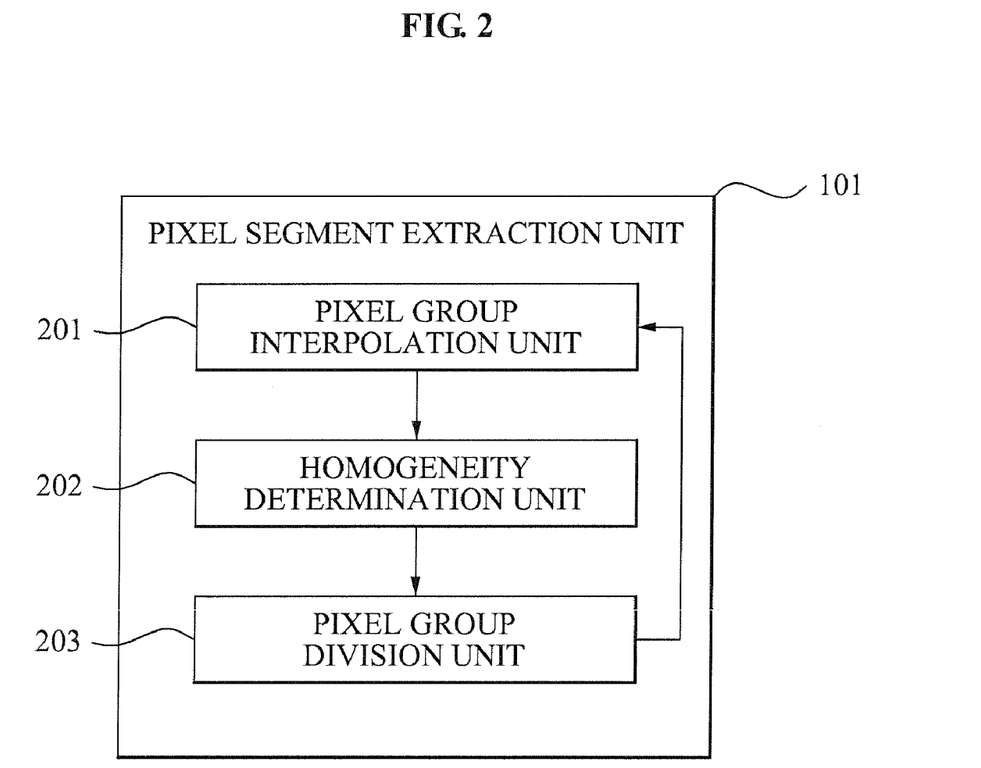
FIG. 2 illustrates a pixel segment extraction unit of the blocking effect removal system of FIG. 1.

FIG. 2 illustrates the pixel segment extraction unit 101 of the blocking effect removal system of FIG. 1.

Referring to FIG. 2, the pixel segment extraction unit 101 can include a pixel group interpolation unit 201, a homogeneity determination unit 202, and a pixel group division unit 203.

The pixel group interpolation unit 201 can interpolate between a starting pixel and an end pixel using a pixel value of the starting pixel and a pixel value of the end pixel of the pixel group. That is, the interpolation can be performed for an area as a corresponding pixel group using the starting pixel and the end pixel of the pixel group as an anchor.

The pixel group interpolation unit 201 can interpolate all pixel blocks adjacent to both sides of a block boundary. When the interpolation is completed by the pixel group interpolation unit 201, a new pixel value for each location between the starting pixel and the end pixel of the pixel group can be determined.

The pixel group interpolation unit 201 can interpolate by applying a variety of interpolation methods. However, when the pixel group is a single line of pixels adjacent to both sides based on the block boundary of the image, a linear interpolation method can be preferably used.

The homogeneity determination unit 202 can determine a homogeneity of the pixel group using a pixel value difference between a pixel value before the interpolation and a pixel value after the interpolation for each pixel location of the pixel group. For example, the homogeneity determination unit 202 can determine the homogeneity of the pixel group using a number of outliers depending on the pixel value difference. Here, an outlier can indicate a pixel in which a difference between the pixel value before the interpolation and the pixel value after the interpolation is greater than a predetermined threshold.

For example, when the number of outliers is greater than the predetermined threshold, the homogeneity determination unit 202 can determine that the homogeneity of the pixel group does not satisfy a predetermined standard.

The pixel group division unit 203 can divide the pixel group considering the homogeneity. For example, when the homogeneity of the pixel group does not satisfy the predetermined standard, the pixel group division unit 203 can divide the pixel group in half. Also, the pixel group division unit 203 can select a block boundary portion from the divided pixel groups.

For example, the pixel segment extraction unit 101 can repeatedly divide the pixel groups until the homogeneity satisfies the predetermined standard. Specifically, when the pixel group is divided by the pixel group division unit 203, the pixel group interpolation unit 201 can interpolate the divided pixel group. Also, the homogeneity determination unit 202 can determine a homogeneity of the divided pixel group, and the pixel group division unit 203 can divide the divided pixel group again depending on the homogeneity of the divided pixel group.

According to an embodiment of the present invention, the pixel segment extraction unit 101 can extract a pixel segment through a sequential operation separately from the above-described repeated operation. First, the pixel group can be divided into segment unit which can be divided. Also, the pixel segment extraction unit 101 can interpolate between a starting pixel and an end pixel of an entire pixel group, which is divided into segment unit, with a new pixel value.

Also, the pixel segment extraction unit 101 can compare the pixel value before the interpolation and the pixel value after the interpolation for each pixel location of the pixel group and determine the homogeneity. A pixel group, having the largest size among pixel groups showing the homogeneity which satisfies the predetermined standard, can be extracted as the pixel segment.

That is, as opposed to the pixel segment extraction unit 101 of FIG. 2, the sequential operation of extracting the pixel segment divides the pixel group into segment unit which can be divided, and extract the pixel group, having the largest size among pixel groups showing the homogeneity which satisfies the predetermined standard, as the pixel segment.

Figure 3:
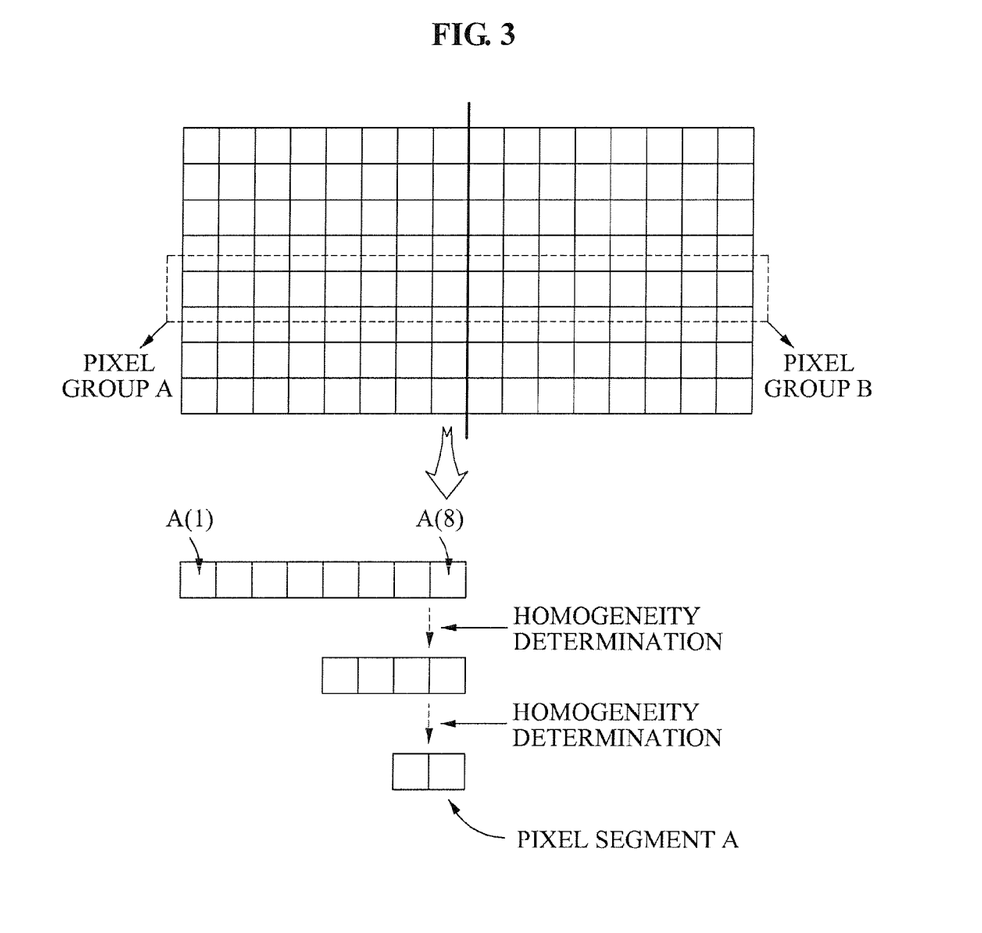
FIG. 3 illustrates an operation of extracting a pixel segment by repeatedly dividing a pixel group according to an embodiment of the present invention.

FIG. 3 illustrates an operation of extracting a pixel segment by repeatedly dividing a pixel group according to an embodiment of the present invention.

FIG. 3 illustrates a pixel group A and a pixel group B which are adjacent to a block boundary of an image. The pixel group A and pixel group B can be a portion of an entire block. In FIG. 3, although a single block includes 8*8 pixels, the present invention is not limited to the 8*8 pixels. The pixel group A and pixel group B can be a single line of pixels adjacent to the block boundary.

In order to extract a pixel segment, the pixel group A and pixel group B adjacent to both sides of the block boundary are used. The pixel group A is described in detail with reference to FIG. 3. A pixel segment can be extracted from the pixel group B in the same way as the pixel group A.

The pixel group A can include pixels identified as A(8) through A(1) based on the block boundary. A pixel group interpolation unit can interpolate between a starting pixel and an end pixel using a pixel value of the starting pixel and a pixel value of the end pixel of the pixel group A. That is, the pixel group interpolation unit can interpolate a pixel value for each pixel location of A(2), A(3), A(4), A(5), A(6), and A(7) using pixel values assigned to A(1) and A(8).

That is, a new pixel value for each pixel location of A(2), A(3), A(4), A(5), A(6), and A(7) is assigned using a relationship between A(1) and A(8).

After the interpolation, a homogeneity determination unit can determine a homogeneity of an entire pixel group using the pixel value before the interpolation and the pixel value after the interpolation for each pixel location. When the homogeneity of the entire pixel group does not satisfy a predetermined standard through the determining of the homogeneity, a pixel group division unit can divide the pixel group A in half, and select a block boundary portion, which is illustrated in FIG. 3.

A pixel segment extraction unit can repeatedly divide the pixel group A until the homogeneity of the pixel group A satisfies the predetermined standard. As illustrated in FIG. 3, the pixel segment extraction unit can extract a pixel segment A through two division operations. A number of divisions can vary for each pixel group.

For reference, FIG. 3 illustrates an operation of repeatedly dividing the pixel group A. As an embodiment of the present invention, a method of sequentially extracting a pixel segment has been described with reference to FIG. 2. That is, the pixel segment A can be extracted from the pixel group A through the sequential operation. A pixel segment can be extracted from the pixel group B in the same way as the pixel group A.

Figure 4:
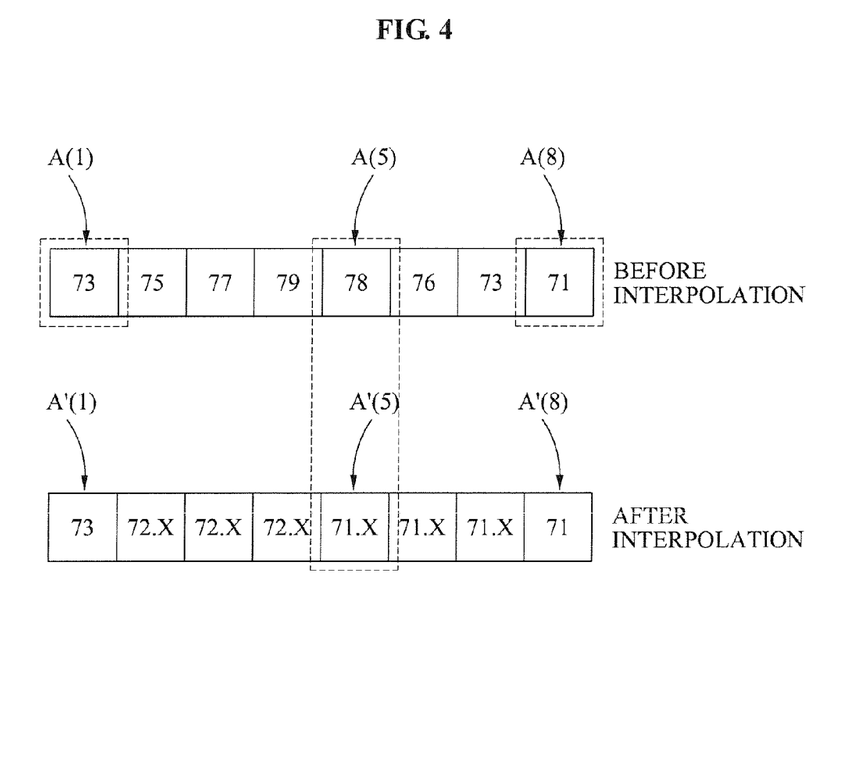
FIG. 4 illustrates an operation of interpolating a pixel group and determining a homogeneity according to an embodiment of the present invention.

FIG. 4 illustrates an operation of interpolating a pixel group and determining a homogeneity according to an embodiment of the present invention.

The pixel group A includes pixels identified as A(1) through A(8) as illustrated in FIG. 2. The pixel group A has a pixel value for each pixel location. The pixel value represents a pixel feature and can include a brightness value, a saturation value, a color value, and the like. However, the pixel value is not limited to a particular pixel feature, and can be differently determined depending on a system.

For example, referring to FIG. 4, the pixel group A can have pixel values of 73, 75, 77, 79, 78, 76, 73, and 71 in an order of A(1) to A(8) for each pixel location. Here, a pixel group interpolation unit can interpolate the pixel values of A(2), A(3), A(4), A(5), A(6), and A(7) using the starting pixel, A(1), and the end pixel, A(8), of the pixel group A. Referring to FIG. 4, the interpolated value can have new pixel values of 73, 72.$x$, 72.$x$, 72.$x$, 71.$x$, 71.$x$, 71.$x$, 71 for each pixel location which is identified as A'(1) through A'(8).

A pixel in which a difference between the pixel value before the interpolation and the pixel value after the interpolation for each pixel location is greater than a predetermined threshold can be set as an outlier. Here, when the outlier corresponds to a pixel having the difference greater than 1, six outliers exist in FIG. 4.

A homogeneity of the pixel group A can be determined according to whether a homogeneity of a corresponding pixel group satisfies the predetermined standard using a number of outliers. When the number of outliers is greater than a predetermined value, it can be determined that a homogeneity of a corresponding pixel group does not satisfy the predetermined standard with respect to the homogeneity.

For example, it is assumed that the number of outliers is required to be less than four to satisfy the homogeneity of the pixel group. Referring to FIG. 4, since the number of outliers of the pixel group A is six, the pixel group A does not satisfy the homogeneity. Accordingly, the pixel group A can be divided in half, and pixel groups from A(5) to A(8), corresponding to the block boundary portion, can be selected from the divided portions.

Also, an interpolation is performed again using the starting pixel, A(5), and the end pixel, A(8), of the pixel group A which is divided in half, and thereby can determine a homogeneity. Through the repeated operations, the pixel group A can be repeatedly divided until the homogeneity satisfies the predetermined standard. A homogeneous pixel segment can be extracted from the pixel group A through the repeated division operation.

Figure 5:
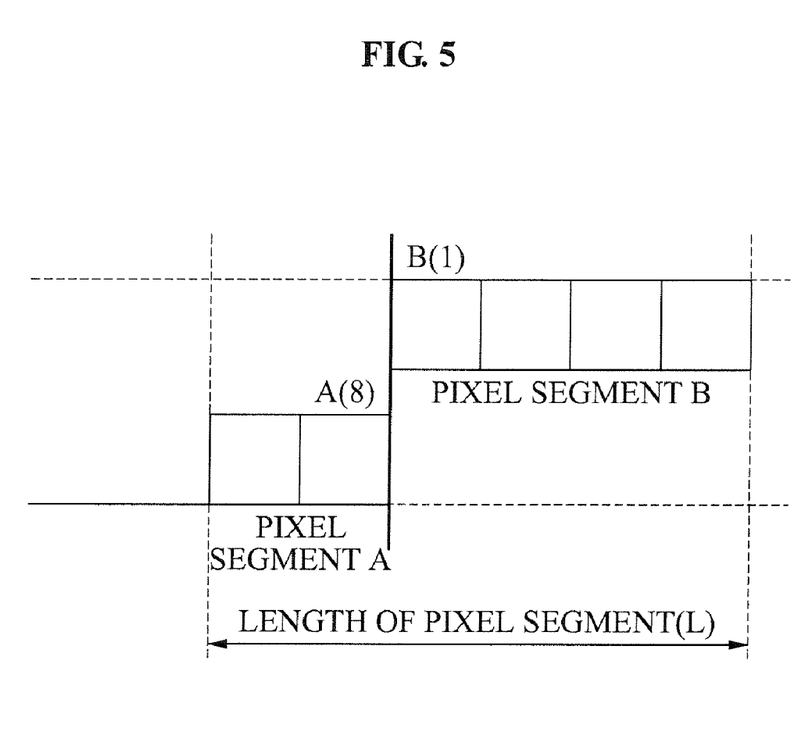
FIG. 5 illustrates an operation of determining whether to bypass a pixel segment and determining a filtering mode according to an embodiment of the present invention.

FIG. 5 illustrates an operation of determining whether to bypass a pixel segment and determining a filtering mode according to an embodiment of the present invention.

FIG. 5 illustrates a pixel segment A, extracted from a pixel group A, and a pixel segment B extracted from a pixel group B.

A bypass determination unit can determine whether to bypass the pixel segment A and the pixel segment B using a pixel value difference of pixels adjacent to both sides of a block boundary in the pixel segment A and the pixel segment B.

For example, the bypass determination unit can determine whether to bypass the pixel segment A and the pixel segment B depending on whether a pixel value difference between an A(8) of the pixel segment A and a B(1) of the pixel segment B is greater than a predetermined threshold. The A(8) of the pixel segment A and the B(1) of the pixel segment B are adjacent to both sides of the block boundary.

When the pixel value difference between the A(8) and the B(1) is greater than the predetermined threshold, a filtering mode determination unit can determine a filtering mode with respect to an entire pixel segment including the pixel segment A and the pixel segment B. Conversely, when the pixel value difference between the A(8) and the B(1) is not greater than the predetermined threshold, the pixel segment A and the pixel segment B can be bypassed without filtering.

The filtering mode determination unit can determine the filtering mode corresponding to a filtering direction by considering a size of a pixel segment. For example, the size of the pixel segment can be determined as a sum of a length of the pixel segment A and a length of the pixel segment B (a length of pixel segment: L). The pixel segment A and the pixel segment B are adjacent to the block boundary.

For example, the filtering mode determination unit can determine a pixel segment as a smooth DC area when the size of the pixel segment is greater than the predetermined threshold. The pixel segment can indicate an area including the pixel segment A and the pixel segment B.

In this case, the filtering mode determination unit can determine that the filtering mode is a first filtering mode which filters in a direction vertical to the block boundary. The smooth DC area can indicate that an edge area of an image is not included in an area of the pixel segment.

When the filtering mode of the pixel segment is determined as the first filtering mode, the pixel segment filtering unit can filter the area of the pixel segment in the direction vertical to the block boundary. The pixel segment filtering unit can filter regardless of the direction vector.

Conversely, when the size of a pixel segment is less than the predetermined threshold, the filtering mode determination unit can determine the pixel segment as a complex area. The pixel segment can indicate an area including the pixel segment A and the pixel segment B.

In this case, the filtering mode determination unit can determine that the filtering mode is a second filtering mode which filters according to the direction vector. The complex area can indicate that the edge area of an image is included in the area of the pixel segment.

Figure 6:
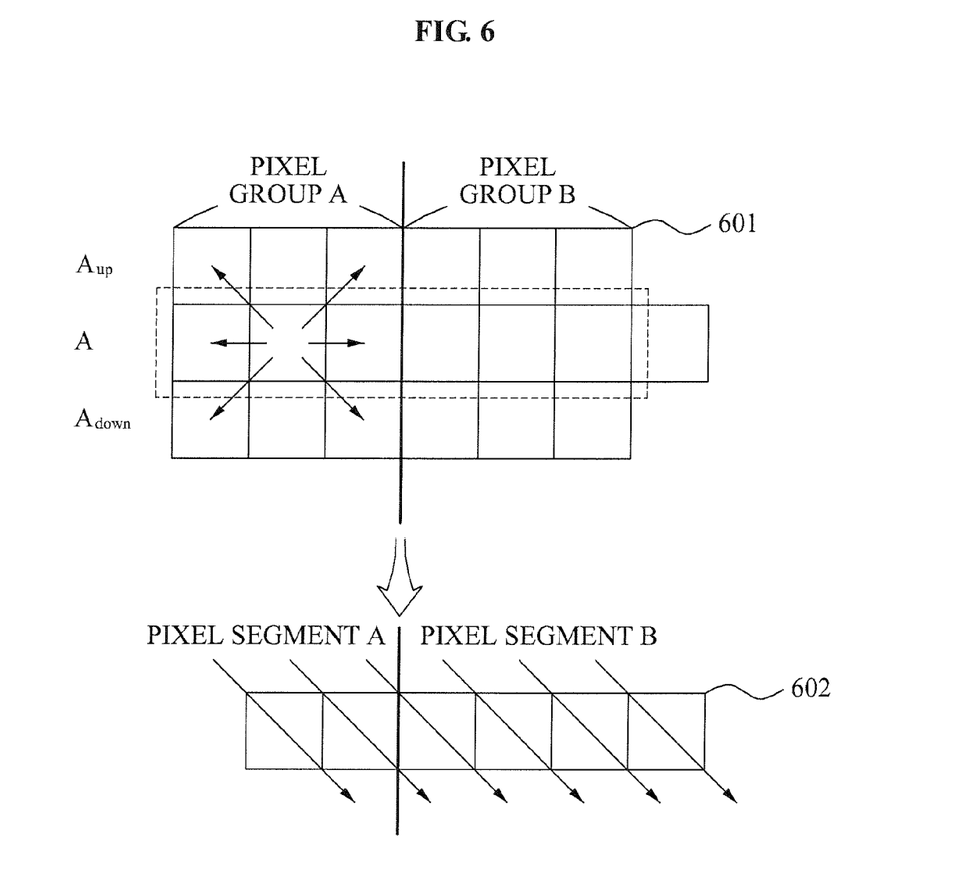
FIG. 6 illustrates an operation of filtering a pixel segment according to a direction vector determined by using a pixel group according to an embodiment of the present invention.

FIG. 6 illustrates an operation of filtering a pixel segment according to a direction vector determined by using a pixel group according to an embodiment of the present invention. A direction vector determination unit described with reference to FIG. 6 is the same as the direction vector determination unit 104 in FIG. 1.

When a filtering mode is determined as a second filtering mode filtering according to the direction vector, the direction vector determination unit 104 can determine a direction vector which is applied to the pixel segment. For example, a direction vector applied to pixels adjacent to a block boundary can be determined using pixel values of the a pixel group 601, an upper pixel group adjacent to the pixel group, and a lower pixel group adjacent to the pixel group.

A pixel group 601 indicates a pixel group A and a pixel group B. For example, the direction vector determination unit 104 according to an embodiment of the present invention can determine the direction vector through the following operations.

First, the direction vector determination unit 104 can set three ranges with respect to the pixel group A based on the block boundary. Also, the direction vector determination unit 104 can refer to the upper pixel group $A_{up}$ and the lower pixel group $A_{down}$. The above-described operation can be applied with respect to the pixel group B. When determining the direction vector, a size of a pixel segment to be extracted for each pixel group is not be considered, and a pixel group prior to extracting the pixel segment can be considered.

Also, the direction vector determination unit 104 can index pixels of the pixel group A, the upper pixel group $A_{up}$ and the lower pixel group $A_{down}$, respectively. Accordingly, each pixel with respect to the pixel group A can be indexed as A(1), A(2), and A(3) from the block boundary, respectively. When applying a same method, the upper pixel group $A_{up}$ can be indexed as an $A_{up}(1)$, $A_{up}(2)$, and $A_{up}(3)$ for each pixel, and the lower pixel group $A_{down}$ can be indexed as an $A_{down}(1)$, $A_{down}(2)$, and $A_{down}(3)$ for each pixel. The above-described indexing can be applied with respect to the pixel group B.

Also, the direction vector determination unit 104 compares a size of a direction vector of a direction vertical to the block boundary of the pixel group A and the pixel group B, and thereby can select a pixel group corresponding to a direction vector having a greater size. That is, |A(1)−A(3)| and |B(1)−B(3)| are compared, and the pixel group having the greater size can be selected. Here, it is assumed that A is selected.

Also, the direction vector determination unit 104 can determine a direction having a minimum pixel value difference as the direction vector. The minimum pixel value difference is obtained by using a pixel value difference among pixels in directions which are vertical, horizontal, and diagonal to a particular pixel of the pixel group.

Here, the vertical direction can indicate $|A_{up}(2)-A_{down}(2)|$, the horizontal direction can indicate |A(1)−A(3)|, and the diagonal direction can indicate $|A_{up}(1)-A_{down}(3)|$ and $|A_{up}(3)-A_{down}(1)|$, respectively. The direction vector determination unit 104 can determine the minimum pixel value difference as the direction vector.

For example, when the vertical direction, $|A_{up}(2)-A_{down}(2)|$, is the minimum pixel value difference, applying a filtering to smooth the block boundary since the vertical direction is parallel to the block boundary can be ineffective. When the vertical direction is the minimum pixel value difference, and the horizontal direction satisfies a predetermined standard, a pixel segment can be bypassed. Conversely, when the horizontal direction does not satisfy the predetermined standard, the direction vector determination unit 104 can determine a second minimum pixel value difference as the direction vector.

A pixel segment filtering unit can filter an area of a pixel segment 602 in a same direction as the direction vector with respect to pixels adjacent to the block boundary. The pixel segment filtering unit can perform a smoothing using a LPF based on the block boundary. However, it is needed that the smoothing is performed in order not to corrupt a high frequency component, that is, an edge area included in an actual image. According to aspects of the present invention, the filtering mode can be determined through a classification of the pixel segment. Also, according to aspects of the present invention, a directional filtering can be performed with respect to a block boundary including an edge.

As illustrated in FIG. 6, it is assumed that the pixel segment 602 includes the pixel segment A and the pixel segment B.

When the direction vector is determined as the diagonal direction $|A_{up}(3)-A_{down}(1)|$, the filtering direction can be assigned as the diagonal direction with respect to pixels adjacent to the block boundary in the pixel segment A and the pixel segment B. Also, the pixel segment filtering unit can filter within an entire pixel segment range. Since a filtering range is limited to a homogeneous pixel segment, the edge of image is not corrupted, and only block boundary can be filtered.

Figure 7:
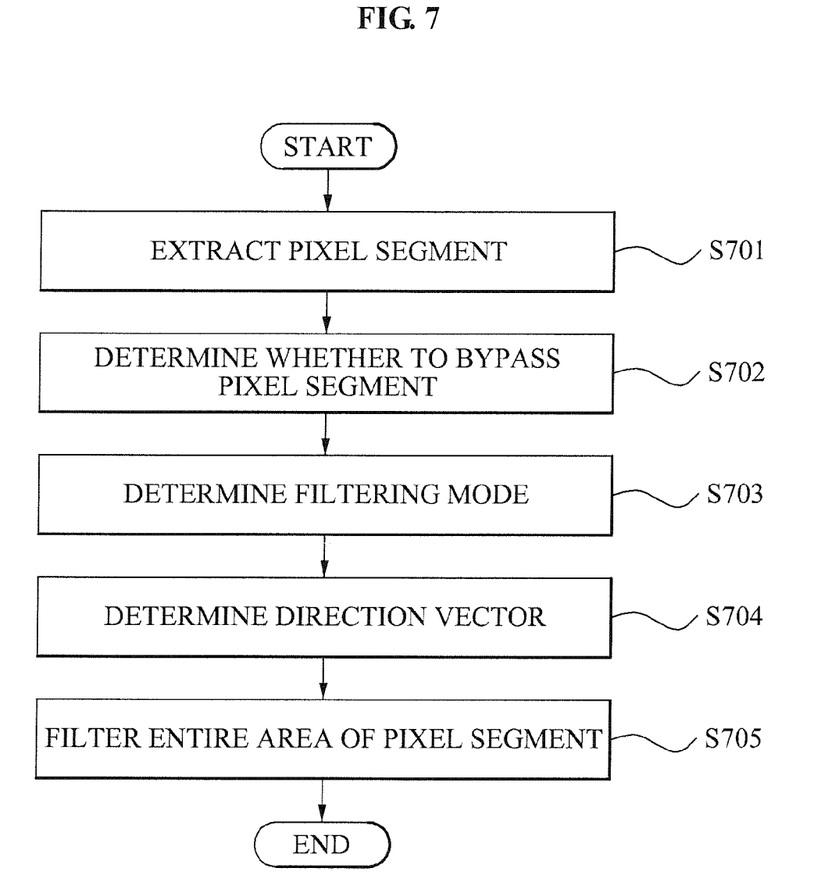
FIG. 7 is a blocking effect removal method according to an embodiment of the present invention.

FIG. 7 is a blocking effect removal method according to an embodiment of the present invention.

In operation S701, the blocking effect removal method repeatedly divides a pixel group of an image and extracts a pixel segment.

The pixel group can be a single line of pixels adjacent to both sides of a block boundary.

In operation S702, the blocking effect removal method determines whether to bypass the pixel segment using a pixel value difference of pixels adjacent to both sides of the block boundary in the pixel segment.

In operation S703, the blocking effect removal method determines the filtering mode corresponding to a filtering direction by considering a size of the pixel segment.

The determining in operation S703 determines any one of a first filtering mode and a second filtering mode using the size of the pixel segment. The first filtering mode filters in a direction vertical to the block boundary, and the second filtering mode filters according to the direction vector.

In operation S704, the blocking effect removal method determines a direction vector which is applied to the pixels adjacent to the block boundary considering the filtering mode.

The determining in operation S704 can determine the direction vector applied to the pixels adjacent to the block boundary using pixel values of the pixel group, an upper pixel group adjacent to the pixel group, and a lower pixel group adjacent to the pixel group.

The determining in operation S704 can determine a direction having a minimum pixel value difference as the direction vector. The minimum pixel value difference is obtained by using a pixel value difference among pixels in directions which are vertical, horizontal, and diagonal to a particular pixel of the pixel group.

In operation S705, the blocking effect removal method can filter an entire area of the pixel segment based on the block boundary according to the filtering direction.

The filtering in operation S705 can filter the entire area of the pixel segment in the direction vertical to the block boundary, when the first filtering mode is determined.

The filtering in operation S705 can filter the entire area of the pixel segment based on the block boundary according to the filtering direction, when the second filtering mode is determined.

The filtering in operation S705 can filter the entire area of the pixel segment by applying a same direction with respect to pixels adjacent to the block boundary.

A description which is not described with reference to FIG. 7 is omitted herein since the description is the same as the description which has been described with reference to FIG. 6.

Figure 8:
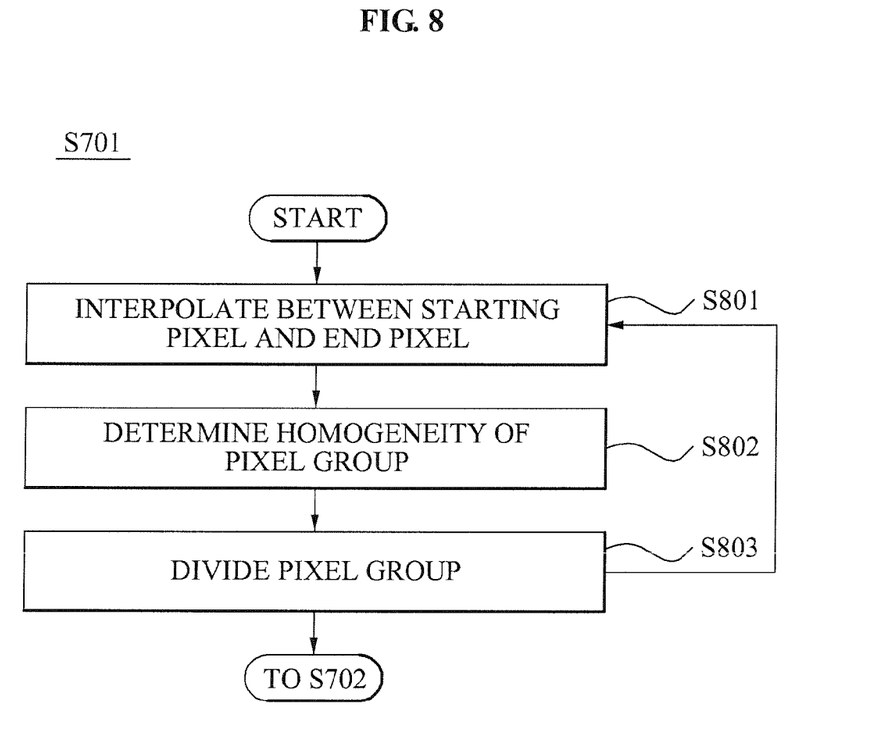
FIG. 8 is a flowchart describing a method of extracting a pixel segment of FIG. 7, in detail.

FIG. 8 is a flowchart describing a method of extracting a pixel segment of FIG. 7, in detail.

In operation S801, the pixel segment extraction method can interpolate between a starting pixel and an end pixel using a pixel value of the starting pixel and a pixel value of the end pixel of a pixel group.

In operation S802, the pixel segment extraction method can determine a homogeneity of the pixel group using a pixel value difference between a pixel value before the interpolation and a pixel value after the interpolation for each pixel location of the pixel group.

The homogeneity can be determined using a number of outliers depending on the pixel value difference.

In operation S803, the pixel segment extraction method can divide the pixel group based on the homogeneity and select a block boundary portion from the divided portions.

The pixel segment extraction method can repeatedly divide the pixel groups until the homogeneity satisfies a predetermined standard.

A description which is not described with reference to FIG. 8 is omitted herein since the description is the same as the description which has been described with reference to FIG. 1 through FIG. 7.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, a blocking effect removal system and method which filters with respect to a homogeneous pixel segment based on a block boundary and removes a blocking effect.

According to another aspect of the present invention, a blocking effect removal system and method which filters within a homogeneous pixel segment, and prevents undesirable corruption of an edge area.

According to another aspect of the present invention, a blocking effect removal system and method which filters within a pixel segment in a same direction based on a block boundary, and can obtain a restoration image with fewer artifacts.

According to another aspect of the present invention, a blocking effect removal system and method changes a filtering mode depending on a length of a pixel segment, and directionally filters based on a block boundary in order to decrease an additional smoothing.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A blocking effect removal system, comprising:
a pixel segment extraction unit to extract a pixel segment which satisfies a homogeneity with respect to each pixel group adjacent to a block boundary of an image;
a filtering mode determination unit to determine a filtering mode corresponding to a filtering direction by considering a size of the extracted pixel segment;
a direction vector determination unit to determine a direction vector which is applied to pixels adjacent to the block boundary considering the filtering mode; and
a pixel segment filtering unit to filter an entire area of the pixel segment, adjacent to the block boundary, according to the filtering direction.

2. The blocking effect removal system as claimed in claim 1, wherein each of the pixel groups is a single line of pixels adjacent to both sides of the block boundary of the image.

3. The blocking effect removal system as claimed in claim 1, wherein the pixel segment extraction unit comprises:
a pixel group interpolation unit to interpolate between a starting pixel and an end pixel using a pixel value of the starting pixel and a pixel value of the end pixel of the pixel group;

a homogeneity determination unit to compare a pixel value before the interpolation and a pixel value after the interpolation for each pixel location of the pixel group and determine a homogeneity of the pixel group; and a pixel group division unit to divide the pixel group based on the homogeneity and select a block boundary portion from the divided portions.

4. The blocking effect removal system as claimed in claim 3, wherein the homogeneity is determined depending on a number of outliers in which a difference between the pixel value before the interpolation and the pixel value after the interpolation is greater than a predetermined value.

5. The blocking effect removal system as claimed in claim 3, wherein the pixel segment extraction unit repeatedly divides the pixel groups until the homogeneity satisfies a predetermined standard of homogeneity with respect to each of the pixel groups adjacent to the block boundary of the image.

6. The blocking effect removal system as claimed in claim 1, further comprising:

a bypass determination unit to determine whether to bypass the pixel segment using a pixel value difference of pixels adjacent to both sides of the block boundary in the pixel segment.

7. The blocking effect removal system as claimed in claim 1, wherein the filtering mode determination unit determines any one of a first filtering mode and a second filtering mode, the first filtering mode filtering in a direction vertical to the block boundary using the size of the pixel segment, and the second filtering mode filtering according to the direction vector.

8. The blocking effect removal system as claimed in claim 7, wherein, when the first filtering mode is determined, the pixel segment filtering unit filters an area of the pixel segment in the direction vertical to the block boundary.

9. The blocking effect removal system as claimed in claim 1, wherein the direction vector determination unit determines the direction vector which is applied to the pixels adjacent to the block boundary using pixel values of the pixel group, an upper pixel group adjacent to the pixel group, and a lower pixel group adjacent to the pixel group.

10. The blocking effect removal system as claimed in claim 9, wherein the direction vector determination unit determines a direction having a minimum pixel value difference as the direction vector, the minimum pixel value difference being obtained by using a pixel value difference among pixels in directions which are vertical, horizontal, and diagonal to a particular pixel of the pixel group.

11. The blocking effect removal system as claimed in claim 1, wherein the pixel segment filtering unit filters an area of the pixel segment by applying the same filtering direction with respect to the pixels adjacent to the block boundary.

12. A blocking effect removal method, comprising:

extracting a pixel segment which satisfies a homogeneity with respect to each pixel group adjacent to a block boundary of an image;

determining a filtering mode corresponding to a filtering direction by considering a size of the extracted pixel segment;

determining a direction vector which is applied to pixels adjacent to the block boundary by considering the filtering mode; and filtering an entire area of the pixel segment, adjacent to the block boundary, according to the filtering direction.

13. The blocking effect removal method as claimed in claim 12, wherein each of the pixel groups is a single line pixel adjacent to both sides of the block boundary of the image.

14. The blocking effect removal method as claimed in claim 12, wherein the extracting comprises:

interpolating between a starting pixel and an end pixel using a pixel value of the starting pixel and a pixel value of the end pixel of the pixel group;

comparing a pixel value before the interpolation and a pixel value after the interpolation for each pixel location of the pixel group, and determining a homogeneity of the pixel group; and dividing the pixel group based on the homogeneity, and selecting a block boundary portion from the divided portions.

15. The blocking effect removal method as claimed in claim 14, wherein the homogeneity is determined depending on a number of outliers in which a difference between the pixel value before the interpolation and the pixel value after the interpolation is greater than a predetermined value.

16. The blocking effect removal method as claimed in claim 14, wherein the extracting repeatedly divides the pixel groups until the homogeneity satisfies a predetermined standard of homogeneity with respect to each of the pixel groups adjacent to the block boundary of the image.

17. The blocking effect removal method as claimed in claim 12, further comprising:

determining whether to bypass the pixel segment using a pixel value difference of pixels adjacent to both sides of the block boundary in the pixel segment.

18. The blocking effect removal method as claimed in claim 12, wherein the determining of the filtering mode determines any one of a first filtering mode and a second filtering mode, the first filtering mode filtering the filtering mode in a direction vertical to the block boundary using the size of the pixel segment, and the second filtering mode filtering the filtering mode according to the direction vector.

19. The blocking effect removal method as claimed in claim 18, wherein, when the first filtering mode is determined, the filtering of the entire area of the pixel segment filters an area of the pixel segment in the direction vertical to the block boundary.

20. The blocking effect removal method as claimed in claim 12, wherein the determining of the direction vector determines the direction vector which is applied to the pixels adjacent to the block boundary using pixel values of the pixel group, an upper pixel group adjacent to the pixel group, and a lower pixel group adjacent to the pixel group.

21. The blocking effect removal method as claimed in claim 20, wherein the determining of the direction vector determines a direction having a minimum pixel value difference as the direction vector, the minimum pixel value difference being obtained by using a pixel value difference among pixels in directions which are vertical, horizontal, and diagonal to a particular pixel of the pixel group.

22. The blocking effect removal method as claimed in claim 12, wherein the filtering of the entire area of the pixel segment filters an area of the pixel segment by applying the same filtering direction with respect to the pixels adjacent to the block boundary.

23. A non-transitory computer-readable recording medium storing a program for implementing a blocking effect removal method, comprising:

extracting a pixel segment which satisfies a homogeneity with respect to each pixel group adjacent to a block boundary of an image;

determining a filtering mode corresponding to a filtering direction by considering a size of the extracted pixel segment;

determining a direction vector which is applied to pixels adjacent to the block boundary by considering the filtering mode; and filtering an entire area of the pixel segment, adjacent to the block boundary, according to the filtering direction.

* * * * *